United States Patent [19]

Wells

[11] Patent Number: 5,332,310
[45] Date of Patent: Jul. 26, 1994

[54] SELF-SUPPORTING HOUSEHOLD STIRRING APPLIANCE

[76] Inventor: Andrew J. Wells, 6257 Star La. NW., Bemidji, Minn. 56601

[21] Appl. No.: 840,025

[22] Filed: Feb. 24, 1992

[51] Int. Cl.⁵ .......................... B01F 7/20; B01F 15/00
[52] U.S. Cl. ..................................... 366/129; 366/344; 366/347; 99/348; 310/50; 310/71; 320/2
[58] Field of Search ................. 320/2; 310/47, 50, 71; 99/348; 366/129, 197, 199, 206, 244–249, 251, 252, 292, 297, 300, 301, 343, 344, 347

[56] References Cited

U.S. PATENT DOCUMENTS

| | | |
|---|---|---|
| 947,922 | 2/1910 | Lewis .................... 366/347 |
| 2,113,916 | 4/1938 | Goldblatt et al. ............. 366/300 X |
| 2,517,648 | 8/1950 | Franke .................... 366/347 |
| 2,681,211 | 6/1954 | Reynolds .................. 366/347 X |
| 2,789,799 | 4/1957 | Kaufman .................. 366/129 X |
| 2,802,499 | 8/1957 | Tupper ................... 366/347 |
| 2,804,290 | 8/1957 | Kaufman ................. 366/331 |
| 2,974,935 | 3/1961 | Smader ................... 366/344 |
| 3,121,178 | 2/1964 | Seyfried et al. ............. 310/50 |
| 3,198,490 | 8/1965 | Jepson et al. ............. 366/344 |
| 3,259,770 | 7/1966 | Mattson et al. ............ 310/50 |
| 3,280,351 | 10/1966 | Wolter et al. ............. 310/50 X |
| 3,333,824 | 8/1967 | Jepson et al. ............. 366/344 |
| 3,333,825 | 8/1967 | Wolter et al. ............ 366/129 |
| 3,357,685 | 12/1967 | Stephens . |
| 3,418,504 | 12/1968 | Paule et al. ............ 310/50 |
| 3,697,053 | 10/1972 | Will . |
| 3,783,770 | 1/1974 | ARies .................... 99/348 |
| 3,810,605 | 5/1974 | Lambert . |
| 3,960,369 | 6/1976 | Sommer .................. 99/348 X |
| 4,151,792 | 5/1979 | Nearhood . |
| 4,184,779 | 1/1980 | Detmer . |
| 4,277,181 | 7/1981 | Stahly et al. ............. 366/343 X |
| 4,339,992 | 7/1982 | Kurland ................... 99/348 |
| 4,417,506 | 11/1983 | Herbst . |
| 4,576,089 | 3/1986 | Chauvin . |
| 5,013,158 | 5/1991 | Tarlow . |

Primary Examiner—Stephen F. Gerrity
Assistant Examiner—Charles Cooley
Attorney, Agent, or Firm—Burd, Bartz & Gutenkauf

[57] ABSTRACT

A self-supporting, cordless, rechargeable battery operated household stirring appliance for use in a saucepan to stir gravy, puddings, soups, and similar food stuffs. The appliance has a body enclosing a battery operated motor and at least one rechargeable battery connected to the motor and held within cavities formed in the housing. A drive gear is journaled in a cylindrical bearing cavity formed in the housing and connected to the drive motor through a speed-reducing gear train similarly journaled in cylindrical bearing cavities formed in tile housing. A multi-bladed ejectable stirring paddle has a central shaft extending into the housing and engaging tile drive gear. A handle which is integral with the housing extends outwardly at one end from the top end of the housing and has a downwardly directed extension which projects from the stirrer handle on the outside of the saucepan and engages the saucepan handle to prevent rotation of the housing during operation of the stirrer. Electrical recharger contacts are located at the end of the handle extension and a cradle including a recharger unit is provided to receive the appliance in electrical recharging engagement.

20 Claims, 3 Drawing Sheets

SELF-SUPPORTING HOUSEHOLD STIRRING APPLIANCE

BACKGROUND OF THE INVENTION

1. Field of the Invention

This invention relates to a household stirring appliance for use in a saucepan to stir gravy, puddings, soups, and similar food stuffs which require stirring to prevent burning and adhesion to the pan bottom and walls. More particularly the invention relates to a self-supporting, cordless, rechargeable battery operated household stirring appliance.

2. The Prior Art

Representative prior art patents disclosing stirring appliances include Stephens U.S. Pat.. No. 3,357,685; Will U.S. Pat. No. 3,697,053; Lambert U.S. Pat. No. 3,810,605; Nearhood U.S. Pat. No. 4,151,792; Detmer U.S. Pat. No. 4,184,779; Herbst et al U.S. Pat. No. 4,417,506; Chauvin U.S. Pat. No. 4,576,089; and Tarlow U.S. Pat. No. 5,013,158.

Of these, the stirrer of the Stephens patent most nearly resembles the stirrer of the present application. The Stephens stirrer is supported from the top edge of a pan by means of diametrically opposed, longitudinally telescoping yokes which have downwardly extending end portions which overhang and engage the rim of the pan. Preferably one of the down turned yoke ends is disposed adjacent to the handle of the pan to prevent rotation of the housing. The stirrer mechanism is spring biased to compensate for varying depths of the pans in which the stirrer may be used.

SUMMARY OF THE INVENTION

The stirring appliance of the present invention incorporates a number of improvements over the stirrers of the prior art. Broadly stated it comprises a cordless rechargeable battery operated household stirring appliance for use in a saucepan which comprises a molded synthetic resinous body enclosing a battery operated motor and at least one rechargeable battery connected to the motor and held within cavities formed in the housing. A drive gear is journaled in a cylindrical bearing cavity formed in the housing and connected to the drive motor through a speed-reducing gear train similarly journaled in cylindrical bearing cavities formed in the housing. A multi-bladed ejectable stirring paddle has a central shaft extending into the housing and engaging the drive bear. A handle which is integral with the housing body extends outwardly at one end from the top edge of the housing. The length of the handle is greater than the radius of the saucepan with which the stirrer is used. A downwardly directed extension from the opposite end of the handle is spaced from and generally parallels the shaft of the stirring paddle. This extension projects downwardly from the stirrer handle on the outside of the saucepan and engages the saucepan handle to prevent rotation of the housing during operation of the stirrer. Electrical recharger contacts are located at the end of the handle extension and a circuitry extends from those contacts to the rechargeable battery.

A cradle is provided to hold the stirrer during recharging. That cradle includes a housing having a first cavity on one side complementary in profile to the forward face and bottom walls of the stirrer housing for receiving the housing in slide fit engagement, and a second cavity on the same side of the housing complementary in profile to the end of the stirrer handle extension for receiving that extension in loose fitting engagement. Electrical contacts in that second cavity engage the recharger electrical contacts in the end of the stirrer handle extension. A recharger power unit is connected to the electrical contacts for recharging of the stirrer batteries.

BRIEF DESCRIPTION OF THE DRAWINGS

The invention is illustrated by the accompanying drawings in which corresponding parts are identified by the same numerals and in which.

DETAILED DESCRIPTION OF THE PREFERRED EMBODIMENT

Figure 1:
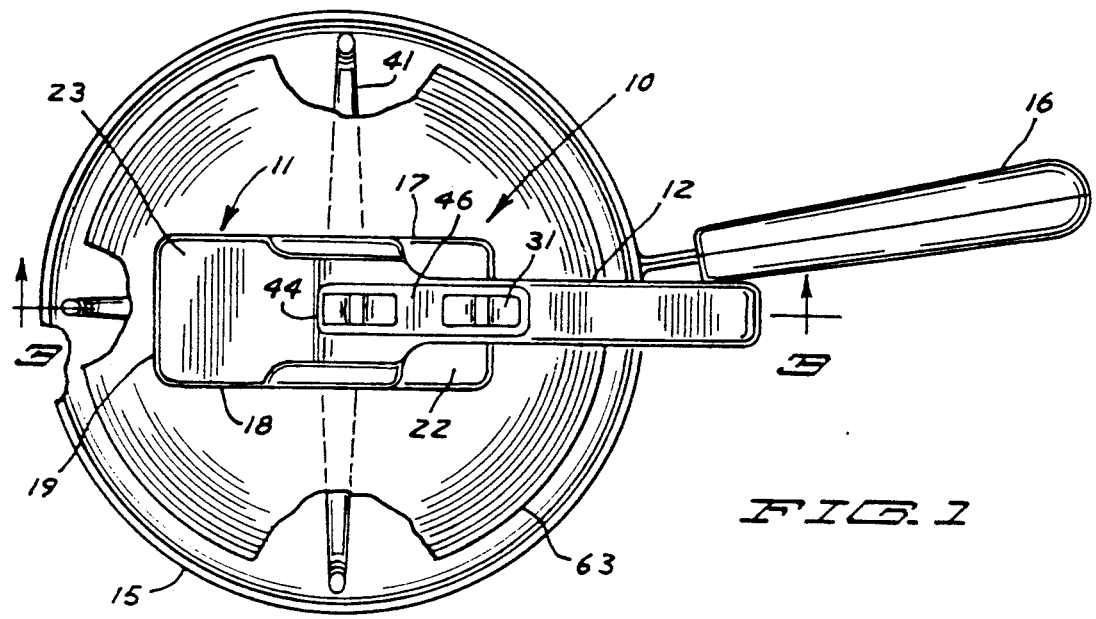
FIG. 1 is a top plan view showing the stirring appliance of the present invention in place in a saucepan.
Figure 2:
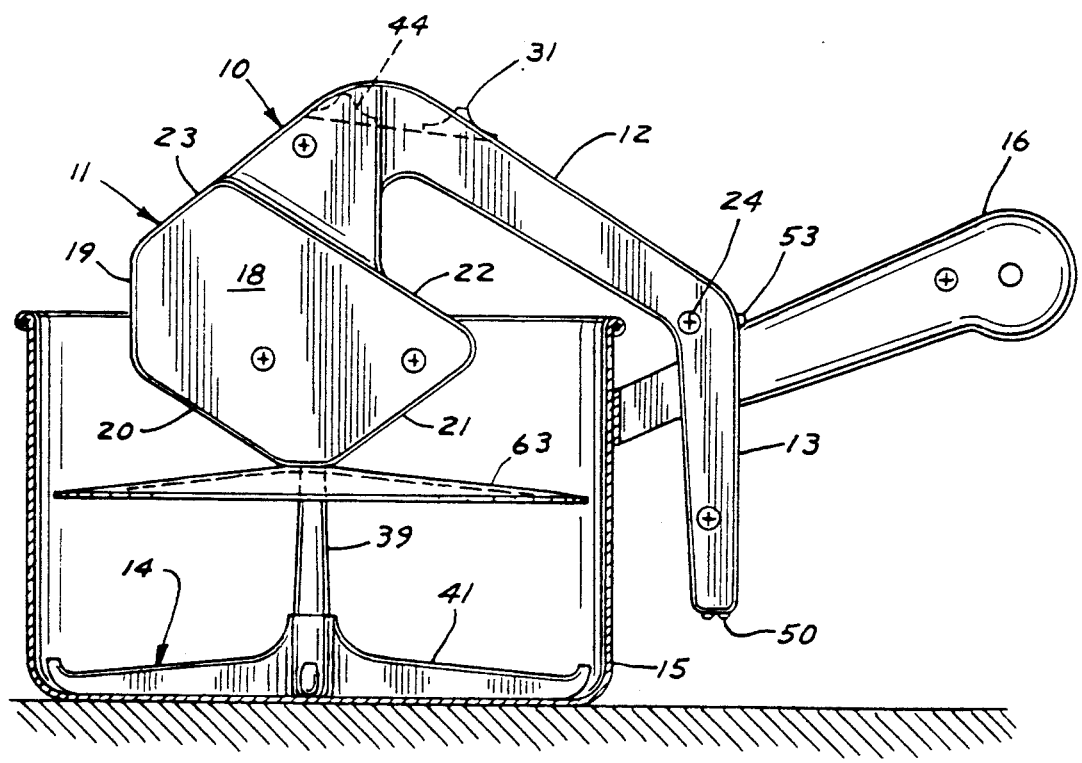
FIG. 2 is an elevation showing the saucepan in section and showing the stirring appliance in place in a saucepan.

Referring now to the drawings and particularly to FIGS. 1 and 2, the stirring appliance of the present invention, indicated generally at 10, comprises a housing, indicated generally at 11, a handle 12 and a handle extension 13. A separable stirring mechanism indicated generally at 14 is engaged at one end within the housing and supports the stirring appliance in a saucepan 15. The stirrer is balanced and self-supporting. In use the stirring appliance is supported by the stirring mechanism 14 resting on the bottom of saucepan 15. Handle extension 13 is positioned outside of saucepan 15 and when the stirrer is in use the handle extension engages handle 16 of saucepan 15, as discussed in detail hereinafter.

Housing 11 is formed, as by molding, from a suitable synthetic resinous material. The housing is characterized by generally parallel spaced apart side walls 17 and 18 and a truncated parallelogram profile providing a flat forward face 19, a pair of downwardly angularly extending covering bottom walls 20 and 21, and a pair of upwardly angularly extending converging top walls 22 and 23. Stirrer handle 12 is integral with body 11 and both are formed as complementary halves connected together, as by screws 24.

Figure 3:
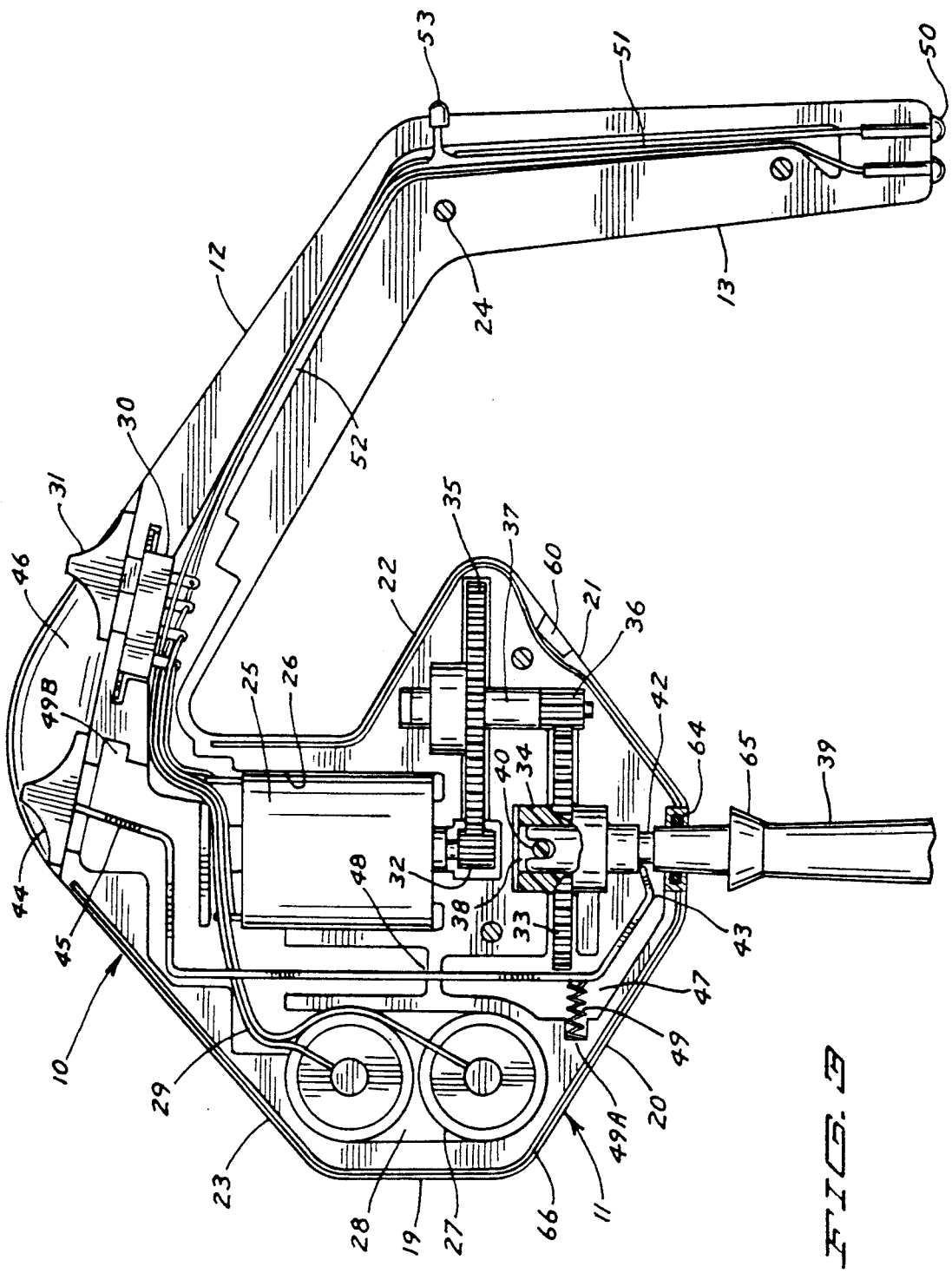
FIG. 3 is a fragmentary vertical section on an enlarged scale on the line 3—3 of FIG. 1 and in the direction of the arrows showing details of the stirring appliance.

As best seen in FIG. 3, housing 11 encloses an electric motor 25, preferably a multi-speed motor, in a cavity 26 of size and shape to securely hold the motor. One or more batteries 27 preferably of the rechargeable type, are similarly securely held within a further cavity 28 within the housing. As is well understood in the art, battery 27 is connected by electrical conductors 29 to switch 30 held in a cavity in the handle. Switch 30 is controlled by a finger actuated button 31 protruding from the top of stirrer handle 12.

The motor drive gear 32 is connected through a speed-reducing gear train to a spaced apart in-line stirrer drive gear 33, the hub of which is journaled in a bearing cavity 34 formed in the housing. The speed-reducing gear train comprises gear 35 in engagement with motor gear 32 and gear 36 connected by shaft 37. Gear 36 in turn is in engagement with stirrer drive gear 33. The hubs of gears 35 and 36, and shaft 37, are similarly journaled in bearing cavities formed in housing 11.

Housing 11 may be formed from any of a plurality of synthetic resinous plastic materials, preferably having lubricating properties. Exemplary resins include polypropylene, nylon, acrylonitrile-butadiene-styrene (ABS), and acetal resins such as sold by duPont under the trademark DELRIN. Gears 33, 35 and 36 may likewise be molded from synthetic resinous materials but, to prevent binding, the gears should be formed from a material different from that of which the housing is composed.

A shaft or spindle 39 of stirring mechanism 14 extends through an opening in the bottom of the housing. The hub of stirrer drive gear 33 has a central axial opening 38 into which the shaft or spindle 39 is received. A transverse pin 40 extends across passage 38. The topmost end of stirrer shaft 39 is bifurcated to engage pin 40 so that the rotary motion of drive gear 33 is imparted to the stirrer mechanism 14.

The stirrer mechanism 14 includes a plurality of generally radial paddles 41 secured to the bottommost end of shaft 39. Paddles 41 may be formed with flat bottom edges which scrape the bottom of saucepan 15 when the stirrer is in operation, or the paddles may extend angularly inwardly and upwardly from their ends, which engage the pan bottom. Preferably the stirrer mechanism includes both such forms of paddle blades. In any event, the ends of the paddles extend horizontally outwardly beyond the outer edges of the overlying housing, as clearly shown in FIGS. 1 and 2, and lie generally in a common plane so that the stirring appliance 10 is independently supported by the paddles so that it does not have to be hand-held in normal use.

The component parts are designed and arranged about the axis of stirrer shaft 39 so as to provide a balanced non-tipping unit. For example, the weight of batteries 27 serves to counterbalance handle 12 and extension 13.

The top end of stirrer shaft 39 is provided with an annular groove or channel 42 spaced downwardly from its bifurcated end. The bottommost end 43 of a stiff elongated latching member engages channel 42 to hold the stirring mechanism 14 in engagement with the housing and drive mechanism when the stirrer is in use. The stirrer mechanism may be ejected for washing, and for recharging of the unit, by means of an ejector button 44 which is connected to the opposite topmost end 45 of the latching member. Ejector button 44 protrudes for sliding finger actuated motion in a channel 46 at the top of the handle 12. The latch member is held in a cavity 47 formed in the housing 11. Intermediate of its ends the latch member passes through a narrow fulcrum-forming throat 48 in that cavity. The lower end of the latch mechanism is spring biased by coil spring 49 seated in a recess 49A formed in the housing to maintain the bottom end 43 of the latch member normally in engagement with channel 42 of the stirrer mechanism shaft. Movement of button 44 against the action of spring 49 causes the latch member to pivot at its passage through throat 48 to withdraw the bottom end of the latch member from engagement with channel 42 to permit the stirrer mechanism to be ejected. Alternatively the latch member may be spring biased at its top end 45 by seating spring 49 in recess 49B, or, in some instances, two springs may be used.

A pair of electrical contacts 50 are provided in the end of handle extension 13 and, as is well understood in the art, are operatively connected by electrical conductors 51 extending through a channel cavity 52 in the handle and extension to the batteries 27. A "charging" or warning light 53 is preferably included in the circuit to visually signal connection of the recharging circuit.

Figure 4:
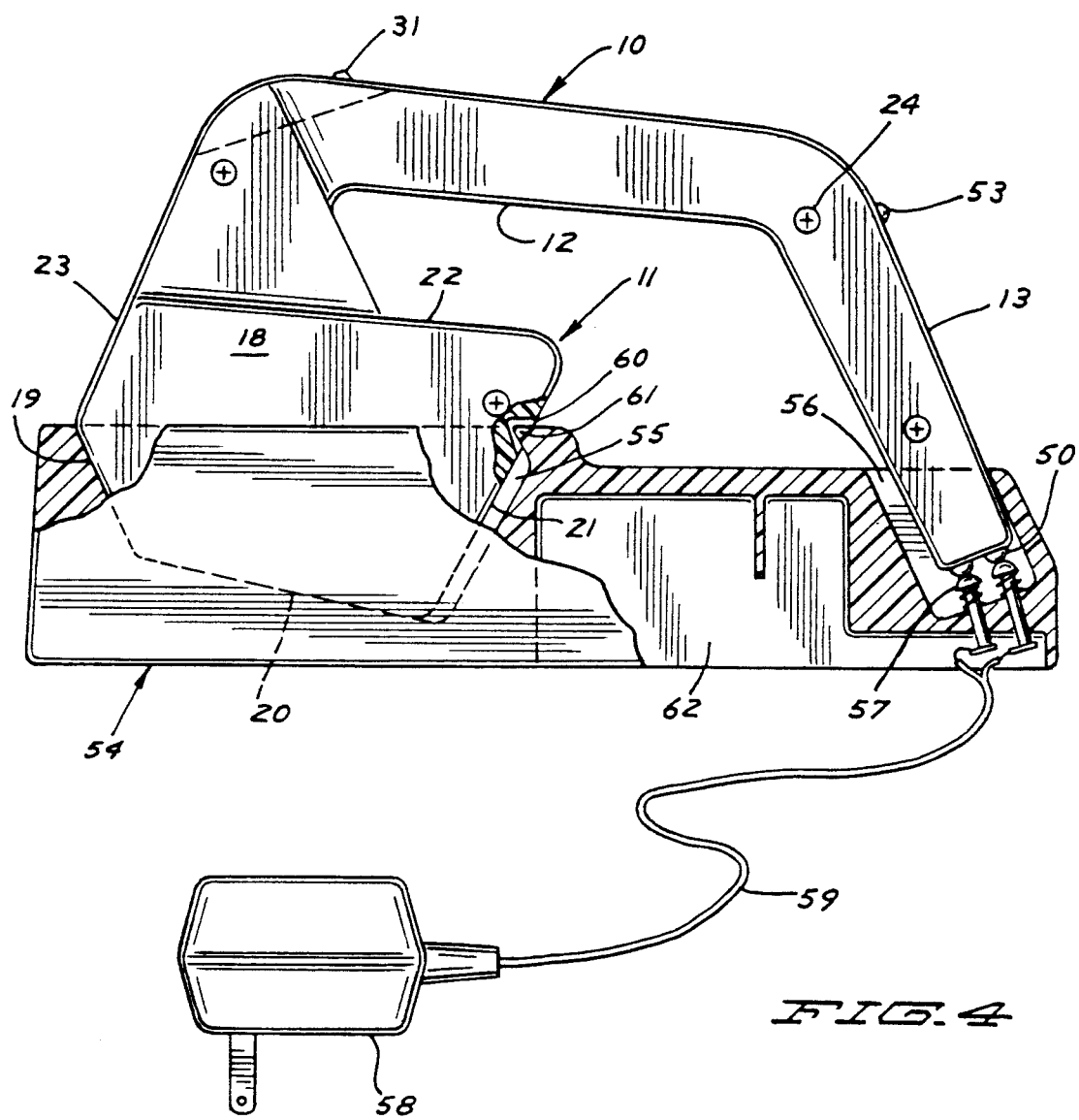
FIG. 4 is an elevation partly in section showing the stirring appliance held within a cradle for recharging.

In order to recharge the batteries of the stirrer a cradle is provided as best seen in FIG. 4 and indicated generally at 54. Cradle 54 is likewise formed, as by molding, from synthetic resinous plastic material. It has a first cavity 55 of size and shape so as to be complementary in profile to the forward face and bottom walls, and opposite side walls, of the stirrer housing for receiving the housing therein in slide fit engagement. The cradle 54 includes a second cavity 56 on the same side as the first cavity and spaced therefrom to receive the end of handle extension 13 in a loose slide fit. A pair of electrical contacts 57 are provided in the bottom of second cavity 56 positioned to engage contact 50 at the end of handle extension 13. Contacts 57 are preferably spring biased. The slide fit engagement of stirrer housing 11 in the first cradle cavity 55 insures proper positioning of the appliance and engagement between electrical contacts 50 and 57. A recharger power unit 58 adapted to connection to a household electric power source is connected by wires 59 to contacts 57. One such recharger unit is OEM brand plug-in power supply S/O 800674. To help insure proper seating of the stirring appliance in the recharger cradle when the cradle is disposed vertically, a notch 60 is preferably provided in bottom wall 21 of the stirrer housing. Notch 60 in turn is engageable with a lip 61 projecting from the top surface of cradle 54 adjacent one edge of cavity 55.

A third multi-compartmented storage cavity on chamber 62 is provided on the opposite or bottom side of cradle 54. The larger compartment of cavity 62 is adapted to receive recharger unit 58 with a close slide fit and the smaller compartment of the cavity is adapted to receive the excess wire 59. In this configuration, the cradle may be supported on a wall or from a wall electrical outlet for receiving the stirring appliance for recharging and, if desired, for storage thereof pending its next use. Alternatively, the recharger unit may be removed from its storage cavity and plugged into a convenient outlet while the cradle rests upon a countertop or the like.

As seen in FIGS. 1 and 2, a splash guard 63 in the form of a disk attached to the stirrer shaft 39 is provided to prevent splattering of the materials being stirred. Preferably an O-ring 64 is provided in the housing at the entry for shaft 39 to prevent any of the material being stirred or moisture from entering the housing at that point. Splash guard 63 may engage the shaft in a slide fit or a collar 65 may be provided to form a supporting shoulder for the guard. Desireably the splash guard is transparent so that the material being stirred may be observed. The splash guard may be flat, or, if the splash shield has a shallow hollow concavity in its bottom face, as shown, any moisture condensed thereon will tend to flow to the outer edge of the shield and back into the material being stirred. Conversely, if the bottom of the shield is convex any condensed moisture will tend to flow toward the shaft and back into the pan. In addition to prevention of splashing, it has been determined that because of conservation of heat in the pan, cooking times are reduced up to about 20 percent.

In order to prevent the material being stirred or moisture from entering and contaminating the interior of the housing, the halves forming the housing may have a tongue and groove configuration at their interface, around the outer edge of the housing. Alternatively, as shown, a gasket or bead 66 of rubber or similar elastic material may be interposed between the housing halves.

In normal use the stirring appliance 10 is placed in the saucepan 15 containing the sauce, gravy or pudding, or the like to be stirred. The stirring appliance rests on the bottom of the saucepan by virtue of paddles 41 engaging the pan bottom wall. The appliance is balanced so that it does not tend to tip toward one side or the other of the saucepan. The handle extension 13 extends downwardly outside the perimeter of the pan. When the motor is initially turned on through use of switch button 31, the paddle blades tend to remain stationary and the appliance housing 11 is rotated until handle extension 13 contacts pan handle 16. Then, since further rotation of the housing 11 is prevented, the torque of the motor is transferred to the stirring mechanism 14 and the paddle blades 41 are rotated within the material to be stirred. As described, the stirring mechanism is readily ejected from the housing for washing and for recharging of the batteries. It is just as readily reengaged with the appliance drive mechanism by inserting the shaft into the bottom of the housing and into engagement with the latching element.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A self-supporting cordless rechargeable battery operated household stirring appliance for use in a saucepan, said appliance comprising:
   A) a molded synthetic resinous housing body defining outer edges,
   B) a battery operated motor and at least one rechargeable battery electrically connected thereto, said motor and battery being held within cavities formed in said housing,
   C) a drive gear journaled in a cylindrical bearing cavity formed in said housing,
   D) a speed-reducing gear train journaled in cylindrical bearing cavities formed in said housing and operatively connecting said drive gear to said motor,
   E) an ejectable stirring paddle at the bottommost end of a central vertical shaft, said shaft extending into said housing and engaging said drive gear, said paddle having at least one horizontally extending blade, said paddle defining distal outer edges, said distal outer edges of said paddle extending beyond the outer edges of the overlying housing and lying generally in a common plane, whereby said paddle, when resting on the bottom of the saucepan, and the vertical shaft, solely and exclusively support and hold the housing body upright during use.
   F) a handle integral with said housing body and extending outwardly at one end from the top edge of the body, the length of said handle being greater than the radius of the saucepan with which the appliance is used,
   G) a downwardly directed extension of the handle extending from the end of said handle opposite from the end which is integral with the housing body, said extension being spaced from and generally parallel to the shaft of the stirring paddle,
   H) recharger electrical contacts in the end of said extension, and
   I) circuitry extending from said contacts to said battery.

2. A stirring appliance according to claim 1 wherein:
   A) an annular channel is provided in the top end of the central shaft of the stirrer paddle,
   B) an elongated spring biased pivotal latching member having two ends and an intermediate portion is contained in a cavity in said housing,
      1) one end of said latching member is positioned adjacent to said channel and is engagable with said channel to retain said paddle shaft in the housing,
      2) an external manually operable latch release button at the top of the housing is connected to the opposite end of the latching member, and
      3) the intermediate portion of said latching member extends through a narrow fulcrum-forming throat in the cavity.

3. A stirring appliance according to claim 1 wherein an annular disk splash shield having top and bottom face surfaces engages the shaft of the stirrer paddle adjacent the top end thereof.

4. A stirring appliance according to claim 3 wherein the bottom face surfaces of said splash shield slope toward the shaft to direct the flow of condensed moisture.

5. A stirring appliance according to claim 1 wherein said body is formed from a synthetic resin having lubricating properties.

6. A stirring appliance according to claim 1 wherein said housing body has generally parallel spaced apart side walls and a truncated parallelogram profile providing a flat forward face, a pair of downwardly angularly extending converging bottom walls and a pair of upwardly angularly extending converging top walls.

7. A stirring appliance according to claim 1 wherein said housing body is formed from complementary halves and sealing means are provided at the interface between said halves around the periphery thereof.

8. A stirring appliance according to claim 1 wherein:
   A) said motor is a multi-speed motor, and
   B) switch means are provided on the top of said housing for actuating said motor.

9. A self-supporting cordless rechargeable battery operated household stirring appliance for use in a saucepan, said appliance comprising:
   A) a molded synthetic resinous housing body formed from a synthetic resin having lubricating properties and having generally parallel spaced apart side walls and a truncated parallelogram profile providing a flat forward face and a pair of downwardly angularly extending converging front and rearward bottom walls and a pair of upwardly angularly extending converging front and rearward top walls,
   B) a battery operated motor and at least one rechargeable battery electrically connected thereto, said motor and battery being held within cavities formed in said housing,
   C) a drive gear journaled in a cylindrical bearing cavity formed in said housing, said drive gear being adapted to engage the central shaft of a multi-bladed ejectable stirring paddle,
   D) a speed-reducing gear train journaled in cylindrical bearing cavities formed in said housing and operatively connecting said drive gear to said motor, E) a multi-bladed ejectable stirring paddle which, when resting on the bottom of the saucepan, supports and holds the housing body upright during use, said paddle having a central shaft extending into said housing and engaging said drive gear, said shaft having an annular channel at its top end, F) an elongated spring biased pivotal latching member having two ends and an intermediate portion contained in a cavity in said housing,
  1) one end of said latching member being positioned adjacent to said annular channel and being engageable with said annular channel to retain said paddle shaft in the housing,
  2) an external manually operable latch release button at the top of the housing connected to the opposite end of the latching member, and
  3) the intermediate portion of said latching member extending through a narrow fulcrum-forming throat in the cavity, G) a handle integral with said housing body and extending outwardly at one end from the top edge of the body, the length of said handle being greater than the radius of the saucepan with which the appliance is used, H) a downwardly directed extension of the handle extending from the end of said handle opposite from the end which is integral with the housing body, said extension being spaced from and generally paralleling the shaft of the stirring paddle, I) recharger electrical contacts in the end of said extension, and J) circuitry extending from said contacts to said battery.

10. A stirring appliance according to claim 9 wherein said housing body is formed from complementary halves and sealing means are provided at the interface between said halves around the periphery thereof.

11. A stirring appliance according to claim 9 wherein an annular disk splash shield having top and bottom face surfaces engages the shaft of the stirrer paddle adjacent the top end thereof.

12. A stirring appliance according to claim 11 wherein the bottom face surfaces of said splash shield slope toward the shaft to direct flow of condensed moisture.

13. In combination:
A) a self-supporting cordless rechargeable battery operated household stirring appliance for use in a saucepan, said appliance comprising:
  1) a molded synthetic resinous housing body having generally parallel spaced apart side walls and a truncated parallelogram profile providing a flat forward face and a pair of downwardly angularly extending converging front and rearward bottom walls and a pair of upwardly angularly extending converging front and rearward top walls,
  2) a battery operated motor and at least one rechargeable battery electrically connected thereto, said motor and battery being held within cavities formed in said housing,
  3) a drive gear journaled in a cylindrical bearing cavity formed in said housing, said drive gear being adapted to engage the central shaft of a multi-bladed ejectable stirring paddle,
  4) a speed-reducing gear train journaled in cylindrical bearing cavities formed in said housing and operatively connecting said drive gear to said motor,
  5) a handle integral with said housing body and extending outwardly at one end from the top edge of the body,
  6) a downwardly directed extension of the handle extending from the end of said handle opposite from the end which is integral with the housing body,
  7) recharger electrical contacts in the end of said extension, and
  8) circuitry extending from said contacts to said battery, and B) a recharging cradle for said stirring appliance comprising:
  1) a housing having a first cavity on one side complementary in profile to the forward face and bottom walls and side walls of the appliance housing for receiving the appliance housing in a slide fit engagement therein,
  2) a second cavity spaced from the first cavity in the same side of the cradle housing as said first cavity and complementary in profile to the end of the appliance handle extension for receiving the same in loose fitting engagement therein,
  3) electrical contacts in said second cavity engageable with the recharger electrical contacts in the end of the appliance handle extension,
  4) a recharger power unit adapted for connection to an electric power source, and
  5) flexible electrical conductors connecting said contacts and power unit.

14. A combination according to claim 13 wherein a third storage cavity is provided in said recharging cradle on the opposite side from said first and second cavities, said storage cavity being adapted to receive the recharger power unit and flexible conductors therein.

15. A combination according to claim 14 wherein:
A) a notch is provided in the rearward bottom housing wall spaced from its intersection with the adjacent rearward top housing wall, and
B) a projecting lip is provided in one edge of said first recharging cradle cavity for engagement with said notch.

16. A self-supporting electrically operated household stirring appliance for use in a saucepan, said appliance comprising:
A) a molded housing body defining outer edges,
B) an electrically operated motor held within a cavity formed in said housing,
C) a drive gear journaled in said housing,
D) a speed-reducing gear train journaled in said housing and operatively connected said drive gear to said motor,
E) a stirring paddle at the bottommost end of a central vertical shaft, said shaft extending into said housing and engaging said drive gear, said paddle having at least one horizontally extending blade, said paddle defining distal outer edges, said distal outer edges of said paddle extending beyond the outer edges of the overlying housing and lying generally in a common plane, whereby said paddle, when resting on the bottom of the saucepan, and the vertical shaft, solely and exclusively support and hold the housing body upright during use, F) a handle integral with said housing body and extending outwardly at one end from the top edge of the body, the length of said handle being greater than the radius of the saucepan with which the appliance is used, and G) a downwardly directed extension of the handle extending from the end of said handle opposite from the end which is integral with the housing body, said extension being spaced from and generally parallel to the shaft of the stirring paddle.

17. A stirring appliance according to claim 16 wherein:

A) an annular channel is provided in the top end of the central shaft of the stirrer paddle, B) an elongated spring biased pivotal latching member having two ends and an intermediate portion is contained in a cavity in said housing, 1) one end of said latching member is positioned adjacent to said channel and is engageable with said channel to retain said paddle shaft in the housing, 2) an external manually operable latch release button at the top of the housing is connected to the opposite end of the latching member, and 3) the intermediate portion of said latching member extends through a narrow fulcrum-forming throat in the cavity.

18. A stirring appliance according to claim 16 wherein an annular disk splash shield having top and bottom face surfaces engages the shaft of the stirrer paddle adjacent the top end thereof, the bottom face surfaces of said splash shield sloping toward the shaft to direct the flow of condensed moisture.

19. A stirring appliance according to claim 16 wherein said housing body has generally parallel spaced apart side walls and a truncated parallelogram profile providing a flat forward face, a pair of downwardly angularly extending converging bottom walls and a pair of upwardly angularly extending converging top walls.

20. A stirring appliance according to claim 19 wherein said housing body is formed from complementary halves and sealing means are provided at the interface between said halves around the periphery thereof.

* * * * *

UNITED STATES PATENT AND TRADEMARK OFFICE
CERTIFICATE OF CORRECTION

PATENT NO. : 5,332,310

DATED : July 26, 1994

INVENTOR(S) : Andrew J. Wells

It is certified that error appears in the above-identified patent and that said Letters Patent is hereby corrected as shown below:

```
Title page, item [57], lines 12 and 14, "tile" should be ---the---
   Column 1, line 49, "bear" should be ---gear---
   Column 2, line 47, "covering" should be ---converging---
   Column 8, line 56, "connected" should be ---connecting---
```

Signed and Sealed this

Twenty-fifth Day of July, 1995

Attest:

BRUCE LEHMAN

Attesting Officer     Commissioner of Patents and Trademarks